United States Patent
Wallrabe et al.

(10) Patent No.: US 10,507,719 B2
(45) Date of Patent: Dec. 17, 2019

(54) FRONT END PART FOR A MOTOR VEHICLE

(71) Applicant: Dr. Ing. h.c. F. Porsche Aktiengesellschaft, Stuttgart (DE)

(72) Inventors: Sven Wallrabe, Leonberg (DE); Dominik Beierl, Korntal-Muechingen (DE); Tina Motz, Braunsbedra (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/351,679

(22) Filed: Mar. 13, 2019

(65) Prior Publication Data
US 2019/0283567 A1      Sep. 19, 2019

(30) Foreign Application Priority Data
Mar. 13, 2018 (DE) .......... 10 2018 105 725

(51) Int. Cl.
  *B60K 11/08* (2006.01)
  *B60K 11/02* (2006.01)
  *B60Q 5/00* (2006.01)

(52) U.S. Cl.
  CPC .............. *B60K 11/08* (2013.01); *B60K 11/02* (2013.01); *B60Q 5/00* (2013.01)

(58) Field of Classification Search
  CPC ............ B60K 11/08; B60K 11/02; B60Q 5/00
  See application file for complete search history.

(56) References Cited

U.S. PATENT DOCUMENTS

2010/0231368 A1   9/2010  Nakayama et al.
2012/0294120 A1*  11/2012 Sakurai .................. H04B 11/00
                                                        367/137

FOREIGN PATENT DOCUMENTS

DE    10 2010 010 655    9/2011
DE    10 2014 103 035    5/2015
EP    2 783 844          10/2014
WO    2013/169312        11/2013

OTHER PUBLICATIONS

European Search Report dated Aug. 30, 2019.

\* cited by examiner

*Primary Examiner* — John D Walters
*Assistant Examiner* — James J Triggs
(74) *Attorney, Agent, or Firm* — Gerald E. Hespos; Michael J. Porco; Matthew T. Hespos

(57) ABSTRACT

A front-end part (12) for a motor vehicle (10) has an inlet opening (14) for the introduction of headwind. An air duct adjoins the inlet opening (14) for supplying the headwind to a radiator and/or to an air conditioning device. An air-directing element (16) directs the headwind into the air duct. A sound generator (18) outputs an acoustic signal along a sound path. The air-directing element (16) at least partially covers the sound generator (18) in the sound path. The air-direction element (16) has a textile material that is sound-permeable for the acoustic signal of the sound generator. The textile material conducts headwind away and also covers the sound generator (18) without significantly affecting the perception of the acoustic signal. Therefore, a simple design of a front-end part (12) for a motor vehicle (10) is provided with a small number of components.

10 Claims, 1 Drawing Sheet

FRONT END PART FOR A MOTOR VEHICLE

CROSS REFERENCE TO RELATED APPLICATION

This application claims priority under 35 USC 119 to German Patent Appl. No. 10 2018 105 725.3 filed on Mar. 13, 2018, the entire disclosure of which is incorporated herein by reference.

BACKGROUND

Field of the Invention

The invention relates to a front end part for a motor vehicle, via which headwind can be directed into the body of the motor vehicle.

Related Art

US 2012/0294120 A1 discloses an ultrasonic speaker arranged in a front end region of a motor vehicle and covered with a sound-permeable, but waterproof cloth so that raindrops passing to the ultrasonic speaker while the motor vehicle is underway can be held back.

There is a constant need to simplify the design of a front end part for a motor vehicle.

It is an object of the invention to provide measures permitting a simple design of a front end part for a motor vehicle.

SUMMARY

According to the invention, a front part for a motor vehicle has an inlet opening for the introduction of headwind. An air duct adjoins the inlet opening for supplying the headwind to a radiator and/or to an air conditioning device, and an air-directing element directs the headwind into the air duct. A sound generator, in particular a fanfare or speaker, outputs an acoustic signal along a sound path. The air-directing element is arranged for at least partially covering the sound generator in the sound path. The air-directing element has a textile material that is sound-permeable for the acoustic signal of the sound generator.

The air-directing element can trap headwind while the motor vehicle is underway and can direct the headwind via the air duct to a motor vehicle unit where use can be made of the headwind. In particular, the headwind that is directed to the motor vehicle unit can be used for cooling fluids, for example to cool engine oil of an internal combustion engine via an air-cooled front radiator or to be used in an air conditioning device for controlling the temperature of a passenger compartment. For this purpose, the air-directing element can be arranged within the inlet opening or within the air duct. The air-directing element may be configured and/or arranged so that the headwind can be deflected and/or conducted away by the air-directing element. In comparison to a sheet-metal plate used as air-directing element, the textile material of the air-directing element permits permeability for sound, and therefore the acoustic signal generated by the sound generator can pass through the textile material of the air-directing element. In particular, air molecules set into movement by the sound generator can be pushed through the textile material of the air-directing element on account of the sound pressure built up by the sound generator. For this purpose, the textile material of the sound generator may be substantially perpendicular to the direction of propagation of the acoustic signal along the sound path. The textile material can be formed with sufficient density that raindrops and/or headwind essentially cannot pass through the textile material at the anticipated driving speeds of the motor vehicle. As a result, the air-directing element cannot only fulfill the function of directing headwind into the air duct, but also the function of protecting the sound generator in the manner of a covering against environmental influences. It is thus not required to provide different components for the different functions. Instead, both functions can be combined in the air-directing element, and therefore the number of components can be reduced. The design of the front-end part is thus simplified. The textile material can conduct headwind away, and the sound generator can be covered without significantly affecting the perception of the acoustic signal. Therefore, a simple design of a front end part for a motor vehicle is made possible by reducing the number of components.

The textile material of the air-directing element can be a sheet-like textile structure, for example a woven fabric, a knit, a mesh, a stitch-bonded fabric, a nonwoven fabric and/or a felt. The textile structure can be composed of natural fibers and/or synthetic fibers. The textile material may be recyclable and/or may be produced at least partially from a recycled raw material. The air-directing element can have, for example, a lattice that may produced from a metallic material and that is backed with the textile material. Therefore, the textile material can be provided with three-dimensional shaping. The sound generator can be formed by a fanfare that can be operated by compressed air and can be used as a horn by a driver of the motor vehicle. However, the sound generator also can be configured as a speaker that can be part of an active sound design system for active noise suppression by destructive interference or for generating a certain engine noise. In particular, the sound generator can cooperate with a speaker to simulate an engine noise so that a motor vehicle that can be driven purely electronically can be perceived acoustically by pedestrians or other traffic participants.

The air-directing element may be air-impermeable for the headwind. The configuration of the textile material and/or the orientation of the textile material of the air-directing element with respect to the direction of flow of the headwind can be selected in such a manner that the dynamic pressure of the headwind against the textile material is not sufficient to penetrate the textile material. Sound pressure provided by the sound generator against the textile material can be higher than the dynamic pressure of the headwind against the textile material. Therefore, the acoustic signal generated by the sound generator can penetrate the air-directing element.

The air duct preferably may have a smaller flow cross section than the inlet opening. Thus, the air-directing element may be arranged for bundling the headwind arriving at the inlet opening into the air duct in the inlet opening. The air-directing element can be part of a substantially funnel-shaped inlet opening, and therefore a correspondingly higher pressure and a corresponding high mass flow can arise in the air duct. Thus, the cooling power that can be achieved with the captured headwind can be high. The air-directing element can prevent a significant mass flow past the air duct from being branched off toward the sound generator as a leakage flow.

The sound generator may communicate with the inlet opening via a sound duct, and an outlet opening of the sound duct can be covered by the air-directing element. Thus, radiation of the acoustic signal, for example toward an underlying surface, can be avoided. This permits a particularly loud and concentrated acoustic signal that can generate a correspondingly high sound pressure at the air-directing element. An opening in the bottom of the front-end part for outputting the acoustic signal would affect the aerodynamics of the front of the motor vehicle and can be avoided.

The textile material of the air-directing element has fibers that are directed and that may be connected to one another by weaving and/or knitting. Various groups of fibers can run at an angle, for example right angle, with respect to one another, and therefore openings bounded by fibers can be provided particularly simply in the textile material and can have particularly small opening cross sections. Thus, the textile material can have a multiplicity of particularly small openings distributed regularly in the plane of the air-directing element.

The textile material of the air-directing element has openings for the passage of the acoustic signal. An opening cross section of the openings may be of such a small size that the air-directing element is waterproof for raindrops. The openings can be penetrated by air molecules of the sound waves generated by the sound generator, and therefore the sound wave can continue in the direction of propagation of the sound wave behind the air-directing element. At the same time, the headwind arriving at the openings, for example because of an oblique impact angle, may not be able to pass through the openings, but rather may be deflected by the material bounding the openings.

The air-directing element may be beveled with respect to the designated longitudinal direction of travel. Thus, an angle of bevel of the air-directing element with respect to the direction of travel is selected for forming a fluid-dynamic laminar boundary layer over the entire region of the air-directing element lying in the sound path of the acoustic signal. The bevels of the air-directing element can be oriented with respect to the relative direction of flow of the headwind so that a boundary layer forms on that surface of the air-directing element that faces the headwind. The boundary layer can flow as a substantially laminar flow along the surface of the air-directing element without penetrating the textile material toward the sound generator. In addition, the boundary layer can act as a barrier that directs the headwind impacting on the boundary layer away from the textile material. Thus, the headwind cannot penetrate the perforated air-directing element.

The air-directing element may have a frame, and the textile material may be stretched in the frame. The frame can force a certain two-dimensional shape on the textile material, with openings in the textile material within the frame not being covered and being able to be penetrated by the sound waves of the sound generator.

That portion of the acoustic signal that differs from structure-borne sound may run exclusively through the air-directing element. The sound generator can be enclosed completely so that the sound waves generated by the sound generator can penetrate to the outside only through the air-directing element. This avoids exit openings that impair the aerodynamics, and leads to good aerodynamics of the front-end part. Part of the acoustic signal generated by the sound generator can be radiated to the outside by means of structure-borne sound. The components transmitting the structure-borne sound can be configured in an aerodynamically optimized manner and do not have any exit openings for soundwaves of the sound generator.

The air-directing element may be fastened pivotably and can be configured in the manner of a flap. Therefore, for example, the air-directing element can be folded away to reach screw connections of a bumper to facilitate installation and repair. The air-directing element may pivot automatically on account of gravity into the intended use position and the dynamic pressure of the headwind may secure the air-directing element in the use position.

A temperature sensor may be connected to the air-directing element. The temperature sensor can be positioned outside the air duct, and therefore connecting lines for transmitting the measured temperature can run outside the air duct.

The invention will be explained by way of example below using preferred exemplary embodiments with reference to the attached drawings. The features illustrated below in each case individually and also in combination can constitute an aspect of the invention.

DETAILED DESCRIPTION

Figure 1:
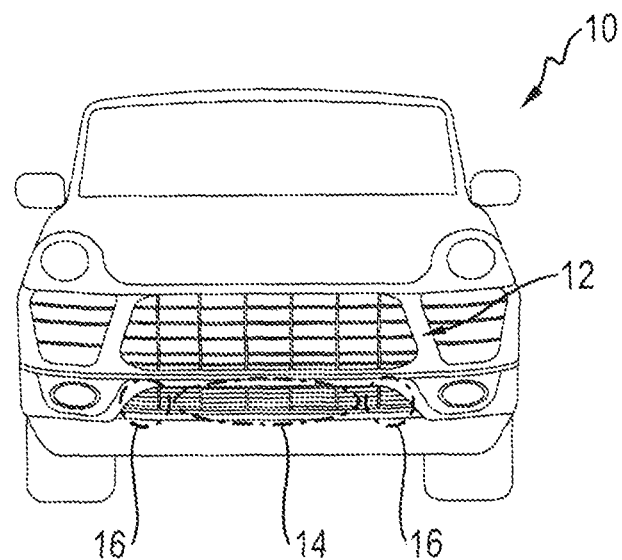
FIG. 1 shows a schematic front view of a motor vehicle.

The motor vehicle 10 illustrated in FIG. 1 can be driven electrically and has a front-end part 12. The front-end part 12 forms part of the outer skin of the motor vehicle 10 and has an inlet opening 14 in a lower part. Air-directing elements 16 are provided at the right and left edge of the inlet opening 14 and are beveled with respect to the longitudinal direction of travel of the motor vehicle. Therefore, the inlet opening 14 has a funnel-shaped profile due to the air-directing elements 16. Headwind trapped by the inlet opening 16 can be directed into an air duct that is not visible. The air duct supplies the headwind, for example, to an air-cooled additional radiator. The additional radiator can cool, for example, a turbocharger, a traction battery, an internal combustion engine or another motor vehicle unit.

Figure 2:
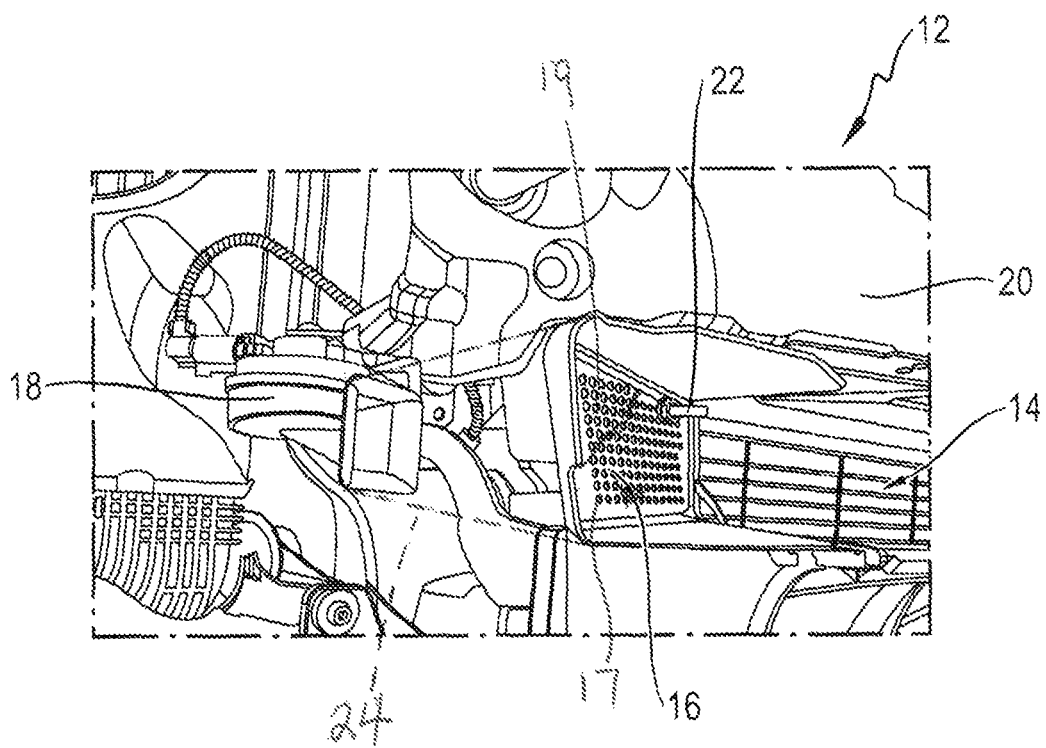
FIG. 2 shows a schematic perspective illustration of an open front-end part of the motor vehicle from FIG. 1.

As illustrated in FIG. 2, the air-directing element 16 can have, for example, a perforated sheet 17 that can be backed by a textile material 19. Alternatively, the perforated sheet 17 can be replaced by the textile material 19 and/or the textile material 19 can be stretched on a frame of the air-directing element 16. Raindrops and headwind cannot penetrate the air-directing element 16 from the outside. A sound generator 18 is behind the air-directing element 16 and may be configured, for example, as a fanfare operated by compressed air. The textile material 19 of the air-directing element 16 is arranged in the sound path and is aligned substantially perpendicularly to the direction of propagation of the sound waves generated by the sound generator 18 In particular, the sound waves are supplied in concentrated form via a sound duct 24, that runs from the sound generator 18 to the air-directing element 16, where the sound pressure is sufficient for the sound waves to penetrate the perforated textile material of the air-directing element 16. Raindrops can be held back by the textile material 19 of the air-directing element 16 and cannot pass to the sound generator 18. By means of the orientation of the air-directing element 16 in a beveled manner with respect to the direction of travel, headwind also cannot penetrate the textile material 19 of the air-directing element 16 since a laminar boundary layer generated by the headwind forms on the surface of the air-directing element.

The air-directing element 16 can be pivotable. Thus, a screw connection of a bumper 20 may be provided behind the air-directing element 16 and can be accessible. In addition, a temperature sensor 22 is connected to the air-directing element 16.

What is claimed is:

1. A front-end part for a motor vehicle, comprising
an inlet opening for introduction of headwind,
an air duct adjoining the inlet opening for supplying the headwind to a radiator and to an air conditioning device,
a sound generator for outputting an acoustic signal along a sound path, and
an air-directing element for directing the headwind into the air duct, the air-directing element at least partially covering the sound generator in the sound path, and the air-direction element having a textile material that is sound-permeable for the acoustic signal of the sound generator.

2. The front-end part of claim 1, wherein the air-directing element is air-impermeable for the headwind that is to be directed.

3. The front-end part of claim 1, wherein the air duct has a smaller flow cross section than the inlet opening, and the air-directing element is arranged for bundling the headwind arriving at the inlet opening into the air duct in the inlet opening.

4. The front-end part of claim 1, wherein the sound generator communicates with the inlet opening via a sound duct, and an outlet opening of the sound duct being covered by the air-directing element.

5. The front-end part of claim 1, wherein the textile material of the air-directing element that are connected to one another by weaving and/or knitting.

6. The front-end part of claim 1, wherein the textile material of the air-directing element has openings for passage of the acoustic signal, opening cross sections of the openings are dimensioned so that the air-directing element is waterproof for raindrops.

7. The front-end part of claim 1, wherein the air-directing element is beveled with respect to a longitudinal direction of travel, an angle of bevel of the air-directing element with respect to the longitudinal direction of travel is selected for forming a fluid-dynamic laminar boundary layer over an entire region of the air-directing element lying in the sound path of the acoustic signal.

8. The front-end part of claim 1, wherein the air-directing element has a frame, and the textile material is stretched across the frame.

9. The front-end part of claim 1, wherein a portion of the acoustic signal that differs from structure-borne sound runs exclusively through the air-directing element.

10. The front-end part of claim 1, wherein the air-directing element is fastened pivotably.

* * * * *